SYSTEM FOR BANDWIDTH COMPRESSION OF BINARY SIGNALS

Filed June 28, 1961 2 Sheets-Sheet 1

INVENTORS
HENRY S. KATZENSTEIN
HERBERT W. SULLIVAN
BY ABRAHAM SANDLER
Darby & Darby
ATTORNEYS

SYSTEM FOR BANDWIDTH COMPRESSION OF BINARY SIGNALS

Filed June 28, 1961 2 Sheets-Sheet 2

FIG. 3 NOR LOGIC CIRCUIT

| IN | A | B | C | D | E | F | D+F TOT | -1 |
|---|---|---|---|---|---|---|---|---|
| 0 | 1 | 0 | 1 | 0 | 0 | 1 | 1 | 0 |
| 1 | 0 | 0 | 1 | 1 | 0 | 1 | 2 | +1 |
| 0 | 1 | 1 | 0 | 0 | 0 | 1 | 1 | 0 |
| 1 | 0 | 1 | 0 | 0 | 1 | 0 | 0 | -1 |
| 1 | 0 | 1 | 0 | 0 | 1 | 0 | 0 | -1 |
| 0 | 1 | 0 | 1 | 0 | 0 | 1 | 1 | 0 |
| 0 | 1 | 0 | 1 | 0 | 0 | 1 | 1 | 0 |
| 1 | 0 | 0 | 1 | 1 | 0 | 1 | 2 | +1 |
| 0 | 1 | 1 | 0 | 0 | 0 | 1 | 1 | 0 |
| 1 | 0 | 1 | 0 | 0 | 1 | 0 | 0 | -1 |
| 0 | 1 | 0 | 1 | 0 | 0 | 1 | 1 | 0 |
| 0 | 1 | 0 | 1 | 0 | 0 | 1 | 1 | 0 |
| 1 | 0 | 0 | 1 | 1 | 0 | 1 | 2 | +1 |
| 1 | 0 | 0 | 1 | 1 | 0 | 1 | 2 | +1 |
| 1 | 0 | 0 | 1 | 1 | 0 | 1 | 2 | +1 |

INVENTORS
HENRY S. KATZENSTEIN
HERBERT W. SULLIVAN
BY ABRAHAM SANDLER
Darby & Darby
ATTORNEYS 3,233,236
Patented Feb. 1, 1966

3,233,236

SYSTEM FOR BANDWIDTH COMPRESSION OF BINARY SIGNALS

Henry S. Katzenstein, Leonia, N.J., Herbert W. Sullivan, New York, and Abraham Sandler, Elmhurst, N.Y., assignors to Lear Siegler, Inc.

Filed June 28, 1961, Ser. No. 120,426
14 Claims. (Cl. 340—347)

This invention relates to data transmission systems and more particularly to a system for bandwidth compression in the transmission of binary signals.

As is well known, there are a number of systems currently in use in which digital or binary data is transmitted. By digital or binary data it is meant that information is represented by binary bits or signals which have two discrete amplitude or voltage levels and which are commonly called 1's and 0's. These 1's and 0's are in turn representative of numbers, words, commands, voltage levels, or other information and are transmitted by radio or microwave links, or over telephone or other transmission lines, or by other types of well known transmission techniques. This is usually accomplished by using the 1's and 0's as the amplitude modulating signals for a carrier wave. For example, when digital data is transmitted via radio system, a radio frequency carrier wave is produced and the binary bits are used to amplitude modulate the carrier wave. In a typical arrangement, a binary 1 results in maximum carrier wave amplitude and a binary 0 results in minimum or zero carrier wave amplitude. The amplitude modulated wave is received and demodulated at the receiver end of the system to recover the original binary data which is representative of the transmitted information.

In any system for transmitting data, including binary data, it is always desirable to reduce the bandwidth needed for message transmission. When bandwidth reduction is achieved, more messages can be carried by a particular transmission channel. For example, where a channel would normally carry 50 messages, by reducing the bandwidth required for each message by a factor of 50% the capacity of the channel would be approximately doubled so that the channel would now be able to carry 100 messages. Such a result is clearly advantageous.

In the past, various systems have been been proposed for bandwidth reduction in the transmission of digital signals. All of these systems have had serious limitations in that they require a large quantity of auxiliary equipment; they are complicated to operate; and complete compatibility with all types of receiving equipment was not achieved. The present invention is directed to a system for compressing the bandwidth of binary signal transmissions which operates in a manner such as to overcome many of the limitations of the prior art systems. In accordance with the invention, the bandwidth needed to transmit a binary signal message is considerably reduced while still using only a small amount of auxiliary equipment at the transmitter and while still maintaining compatibility with all types of receivers.

In accordance with the operating principles of the invention the aforesaid advantages are obtained by changing the algebraic sign of some of the bits in the binary signal so that the original binary signal is converted from one which has binary (two level) values of 1 and 0 to a ternary (three level) signal which has values 0, +1 and —1. The ternary signal is used to control the amplitude and phase of the transmitted carrier wave signal in a manner such that the phase of the carrier wave signal is changed with respect to a +1 and a —1 bit with the carrier wave amplitude being effectively the same (maximum) for both the bits. In a preferred embodiment of the invention, the phase change for the +1 and —1 bits is approximately 180°. When the ternary signal is 0, the carrier amplitude is effectively kept at a minimum, usually zero, as would be the case in a standard binary data transmission system. In the preferred embodiment of the invention, the values of +1 and —1 are assigned to the various "1" bits in the original binary signal in accordance with the rule that the algebraic sign of each block of 1's following a 0 is changed.

As pointed out above, the system of the present invention has several advantages. The principal advantages are that the bandwidth of the transmitted signal is substantially reduced by the phase reversal of the carrier, while compatibility is retained with all amplitude modulated type receiving equipment, for example, single sideband or double sideband type. The latter result stems from the fact that the signal transmitted by the system is still amplitude modulated as "1's" and "0's" even though portions of it are of opposite phase. Since all of the information of the original binary signal is contained in the envelope, irrespective of the phase of the carrier wave, no special discrimination is needed at the receiver to segregate the +1 and —1 signals since the segregation is not necessary in recovering the original binary signal.

It is therefore an object of this invention to provide a system for the bandwidth compression of binary signals.

Another object of this invention is to provide a system in which a binary signal is converted into a ternary signal.

Still a further object of this invention is to provide a system in which a binary signal is converted into a ternary signal and the ternary signal is used to control the amplitude and phase of a transmitted carrier wave.

Yet another object of the invention is to provide a data transmission system in which the phase of the amplitude modulated carrier wave is controlled in accordance with the sequence of binary 1's and 0's to be transmitted.

Other objects and advantages of the present invention will become more apparent upon reference to the following specification and annexed drawings, in which.

Figure 1A:
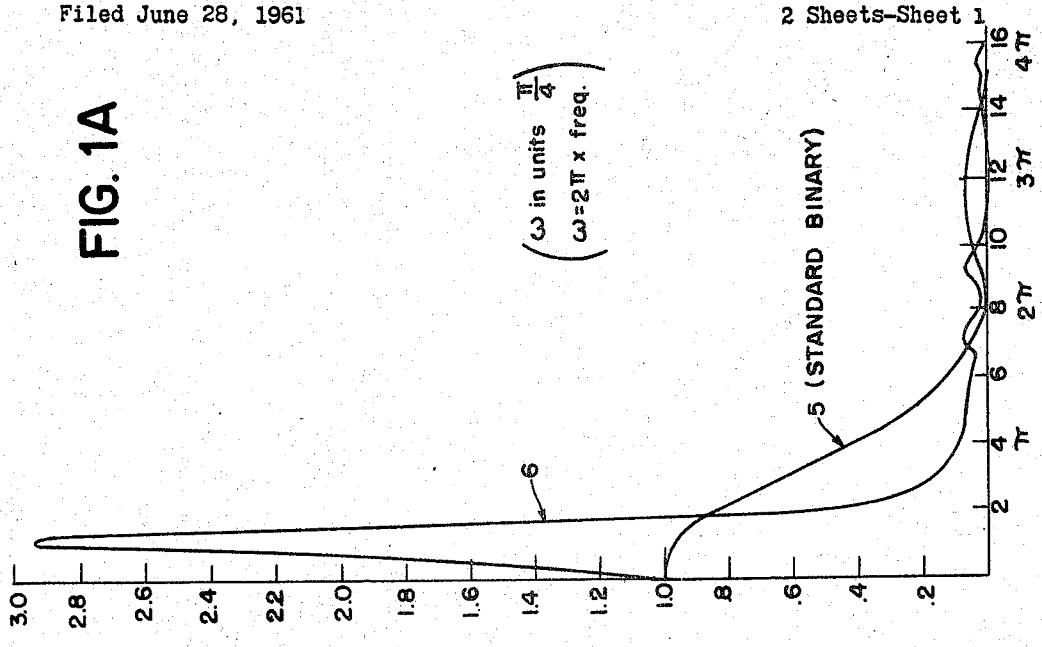
FIGURE 1A, is a graph showing the power-frequency characteristics of signals transmitted by a standard binary transmission system and by a system according to the present invention.
Figure 1:
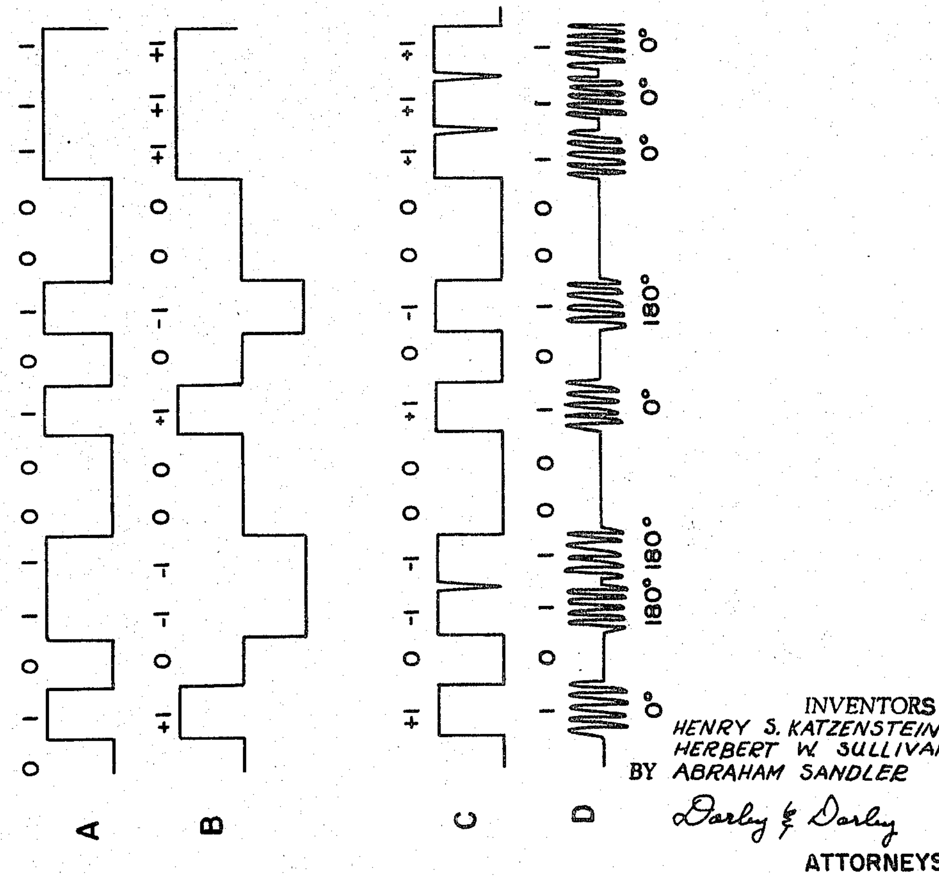
FIGURE 1 is a diagram of a series of signals illustrating the operating principles of the present invention.

Referring to FIGURE 1, a typical binary signal for use with any type of a radio frequency, microwave or transmission line transmit-receive system is shown on line A. The signal is formed by a number of binary 1's and 0's with the amplitude of the binary 1 signals being a predetermined amplitude above the base line which represents the binary 0's. These binary signals are used to amplitude modulate a carrier wave so that when a binary 1 is transmitted the carrier wave has maximum amplitude and when a binary "0" is transmitted the carrier wave has minimum or zero amplitude. In the case where audio frequency tone signals are transmitted as the carrier wave, the 1's signify the presence of the tone and the 0's the absence of the tone. It should be realized of course, that the described procedure can be reversed if desired for any reason so that the 0's would produce maximum amplitude of the carrier and the 1's produce minimum carrier amplitude.

In accordance with the invention, the binary coded signal of line A is converted into a ternary (3-level) signal, formed by bits of information arbitrarily called +1, −1 and 0. The conversion of the binary signal into a ternary signal is preferably accomplished in accordance with the rule that after every 0 bit the algebraic sign of each block of 1 bits following the 0 bit is reversed. This is shown in lines A and B of FIGURE 1 where it can be seen that a 0 bit occurs after the first 1 bit (arbitrarily called +1) and the next two 1 bits have been converted into −1 bits. After the two −1 bits two 0 bits occur and the next 1 bit of line A is left as a +1 bit. The conversion from binary to ternary code in the prescribed manner is carried out for an entire binary coded signal, only a portion of which is shown in lines A and B of FIGURE 1.

The +1, −1 and 0 bits of the ternary coded signal are used to control the amplitude and phase of the carrier wave signal which transmits the amplitude modulated (1 and 0) information of the original binary signal. Both the +1 and −1 bits are used to produce a modulated carrier wave signal of the same amplitude, which will normally be the maximum carrier wave amplitude, and the 0 bits to produce a carrier wave of zero or minimum amplitude. In order to achieve the bandwith reduction, the +1 and −1 bits of the ternary signal are also used to control the phase of the transmitted carrier wave signal so that a predetermined phase difference exists in the carrier wave during the occurrence and in accordance with the +1 and −1 bits. In a preferred embodiment of the invention, the −1 bits cause the production of a carrier wave signal which is 180° out of phase with respect to the phase of the signal produced by the +1 bits.

In FIGURE 1, line C, the −1 bits are shaded to indicate that the carrier wave signal is of a different phase than the signal produced by the +1 bits. The transmitted signal is shown in FIGURE 1, line D where it can be seen that the carrier wave produced in response to the +1 bits is 180° out of phase with respect to the carrier wave produced in response to the −1 bits, and a zero output is produced in response to a 0 bit.

It can be shown statistically and mathematically that the binary data transmission system of the present invention substantially reduces the bandwidth of the transmitted signal. The results of one such analysis is shown in FIGURE 1A, in which curve 5 represents the spectral density, derived by statistical analysis, of a random binary signal transmitted by a standard system and curve 6 represents the spectral density of a random binary signal transmitted in accordance with the transmission system of the present invention. The Y axis of the graph represents power and X axis represents frequency. It can be seen, that curve 6 has a narrow sharp major peak signifying that most of the power is concentrated in a narrow bandwidth. The major peak of curve 5 is smaller in amplitude and occupies a greater bandwidth. This means that it takes more bandwidth to transmit the same amount of effective power, or, stated another way a message of substantially the same power can be transmitted in a narrower frequency band by the present system by using a standard binary transmission system. The occurrence of the narrow major peak in curve 6 is also advantageous since it allows the system to operate with components which need be capable of handling only a narrow bandpass. Components of this type are less expensive than similar components which have to handle wider bandpass signals.

Figures 2, 3, 4, 5, 6:
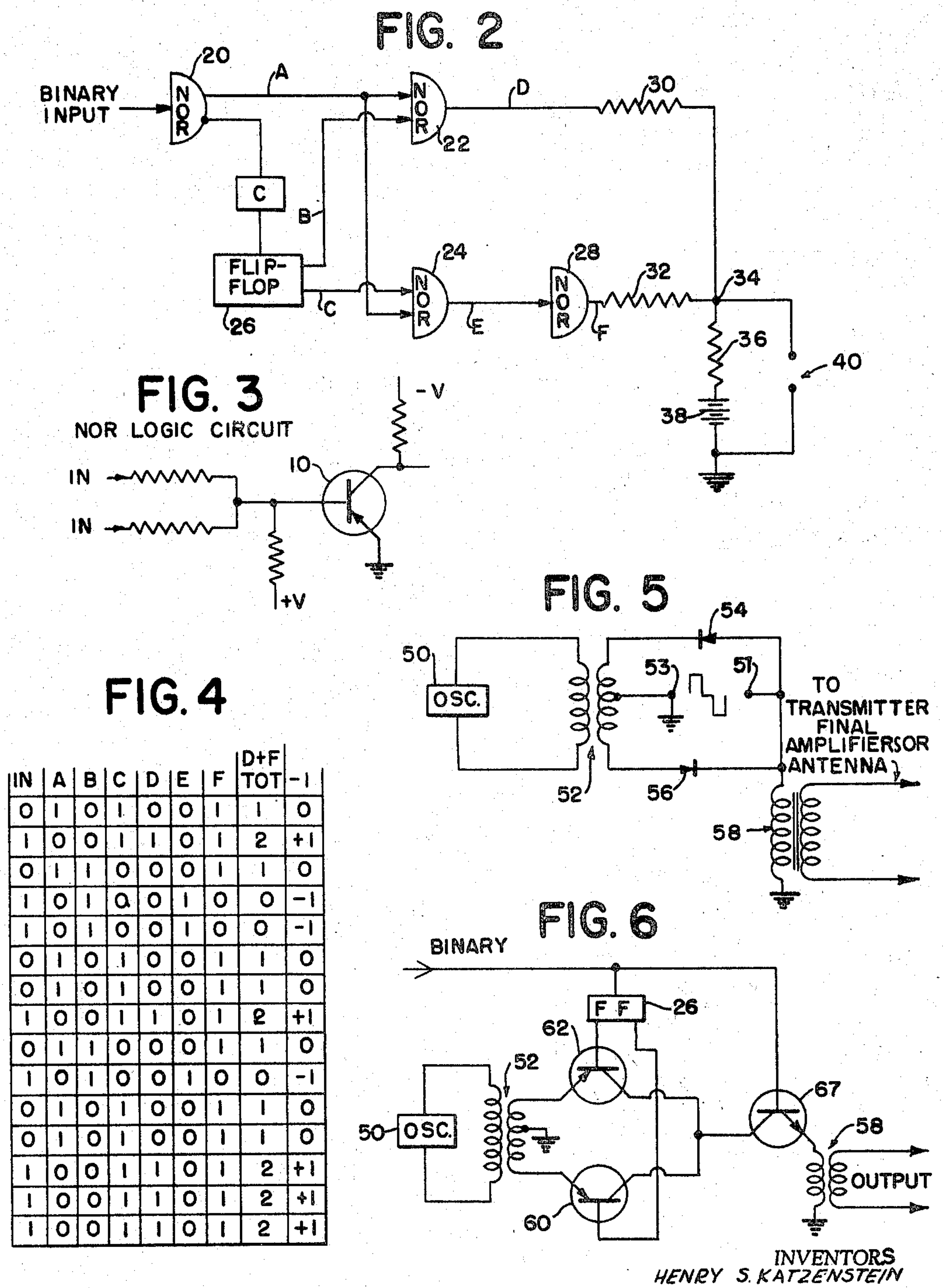
FIGURE 2 shows a schematic block diagram of a circuit for converting a binary input signal to a ternary output signal.
FIGURE 3 shows a schematic diagram of a typical NOR logic circuit.
FIGURE 4 is a chart showing the output signals at various points of the circuit of FIGURE 2 in response to different input signals.
FIGURE 5 is a schematic diagram of a circuit in which the ternary output signal is used to control the phase and amplitude of the carrier frequency wave.
FIGURE 6 is a schematic block diagram of another circuit for converting binary code into ternary code and for using the ternary code to control the amplitude and phase of a carrier wave.

Referring to FIGURE 2, an electronic circuit is shown for converting the binary coded input signal into a tenary output signal. This circuit is formed by a plurality of NOR logic circuits 20, 22, 24 and 28 and a complementary flip-flop circuit 26. The outputs of these circuits are designated by the letters A–F at the places shown. Briefly described a NOR logic circuit is one that performs both an OR and an inversion function when a signal is applied to it. Stated another way, in a single input NOR circuit a binary 1 input signal produces a binary 0 output signal and a binary 0 input signal produces a 1 output signal. In a two input NOR circuit a binary 1 signal at either input produces a 0 output.

The various circuits used in FIGURE 2 are standard in the art and may be formed by any suitable components such as vacuum tubes, diodes, magnetic amplifiers, transistors, tunnel diodes, etc. A typical NOR circuit for use in the present invention is shown in FIGURE 3 and is formed by a transistor 10 of the PNP type connected in a collector-emitter configuration. This circuit can be used as either a one or two input NOR circuit. The collector and base electrodes of the transistor are biased through suitable respective negative and positive power supply sources (not shown) so that the transistor 10 is normally in the quiescent cutoff condition, i.e., the collector output voltage is near the collector bias battery voltage. When a negative (0) input pulse is applied to either of the two inputs, the transistor is driven into saturation causing the collector voltage to approach zero and produce a 1 output. A positive (1) signal on either or both input lines has no effect on a quiescent condition of the transistor and produces a 0 output pulse.

The flip-flop circuit 26 of FIGURE 2 is of the complementing type which changes its state in response to the pulse transition every time that a 0 pulse is received after a 1 pulse. Such circuits are well known in the art and are for example described in Richards "Digital Computer Components & Circuits," D. Van Nostrand and Co., New York, 1957, at page 161. The operation of flip-flop 26 may be described as follows. For example, assume that the initial condition of the flip-flop is such that it has a 1 output at point B and a 0 output at point C. The flip-flop remains in this state until there is a 1–0 pulse transition so that the appearance of the 0 pulse after the 1 at its input switches the flip-flop to its other state in which it has a 0 output at point B and a 1 output at point C. The circuit does not respond to any succeeding 1 pulses after the 0 but it switches its state when the next 0 occurs after a 1. This action continues so that the flip-flop is essentially a switch which changes its state after every 1–0 transition.

The operation of converting a binary to a ternary signal may be understood by referring to FIGURE 2 in which the binary input signal of FIGURE 1, line A is applied to the input of a first NOR circuit 20 which has two parallel outputs. The output labelled point A is connected to one input of a first two input NOR circuit 22 and 0 input of a second two input NOR circuit 24. The other output of circuit 20, which has the same signal appearing thereon as at point A is connected to the input of the complementing flip-flop circuit 26. The flip-flop 26 has two outputs B and C which are respectively connected to the second input of NOR 22 and the second input of NOR 24. The output E of NOR 24 is connected to the single input of another NOR circuit 28 and the outputs D and F of circuits 22 and 28 are connected through the respective resistors 30 and 32 to a common junction point 34 where their output signals are added across a resistor 36 which is in series with a bias battery 38. The battery 30 shifts the added output signals from circuits 22 and 28 by subtracting a one unit quantity so that the desired 0, +1 and −1 signals can be obtained at the output 40.

The operation of the circuit may be explained by referring to the chart of FIGURES 2 and 4. The respective columns labelled A–F of FIGURE 4 correspond to the same output points for the NOR and flip-flop circuits of FIGURE 2. The 1's and 0's in the column labelled "IN" in FIGURE 4, reading from top to bottom, correspond to the pulse train of FIGURE 1, line A.

The first 0 input pulse applied to NOR circuit 20 appears as a 1 at point A and switches flip-flop 26 to a condition so that it has a 0 output at point B and a 1 output at point C. The occurrence of a 1 (point A) and a 0 (point B) at the inputs of NOR 22 produces a 0 output at point D, while the occurrence of a 1 (point A) and a 1 (point C) at the inputs of NOR 24 produces a 0 output at point E and a 1 at output point F of NOR 28. The outputs 0 and 1 at points D and F are added at junction point 34 to give a one unit total and the bias battery 38 connected to junction point 34 through resistor 36 subtracts one unit from the total voltage at point 34 to produce a 0 output. This output is the same as the original input signal.

The next signal applied to the input of NOR 20 is a 1 and the output at point A is a 0. The flip-flop 26 remains in the same state since it is responsive only to negative going (0) pulses. With the same conditions for the flip-flop 26 outputs B and C, the outputs at points D and F are 1 and 1 respectively which, when added at junction 34, produce a two unit quantity. When a one unit quantity is subtracted from this, a +1 signal is produced at output 40. The next zero pulse into NOR 20 reverses the state of the flip-flop so that a 1 appears at point B and a 0 at point C. Tracing the circuit operation it can be seen that the 0 input signal produces a 0 at point D and a 1 at point F. When added together the 1 and 0 give a one unit quantity from which a one unit quantity is subtracted to produce a 0 output.

The next 1 applied to the input meets the reversed state of the flip-flop 26 and causes two 0's to be produced at points E and F for a zero unit quantity total. When the one unit quantity is subtracted from the zero quantity, a −1 signal is produced at output 40.

By comparing the chart of FIGURE 4 with the circuit operation disclosed in FIGURE 2 it can be seen that the ternary waveform of FIGURE 1, line B is produced for the original binary signal shown in FIGURE 1, line A. Therefore, the circuit of FIGURE 2 readily converts the binary coded binary signal into a ternary signal.

In order to use the ternary signal to control the phase of a carrier wave signal, the circuit of FIGURE 5 may be used. This circuit includes a continually operating oscillator 50, which may be of the radio frequency, audio frequency, or other suitable type, which produces a substantially sinusoidal signal across the primary winding of a tranformer 52. The secondary winding of transformer 52 is center tapped and connected to a point of reference potential 53 so that the signal produced by the oscillator 50 appears 180° out of phase at the top and bottom of the secondary winding.

Connected to the top and bottom of the secondary winding are the respective oppositely poled diodes 54 and 56. The anode of diode 54 is connected to the cathode of diode 56 at junction 57 and the ternary control signal from the circuit of FIGURE 2 is applied between junction 57 and reference potential point 53. The respective diodes 54 and 56 are biased from suitable sources (not shown) or are selected to have a forward characteristic to conduct only when the proper magnitude and polarity ternary control signal is applied thereto. More particularly, diodes 54 and 56 will be non-conductive in response to only the carrier wave signal from the oscillator and a 0 ternary control signal and respectively conductive in response to a +1 and a −1 signal. Depending upon which diode is conducting, an output signal is applied to the primary winding of an output transformer 58 whose secondary winding is connected to the final power amplifiers of the transmitter or to an antenna.

The ternary control signal from the output terminals 40 of FIGURE 2 is applied across the junction 57 and ground 53 to the anode of diode 54 and the cathode of the diode 56. When a +1 (positive) signal appears, diode 56 is kept cut off and diode 54 is rendered conducting. The signal from the oscillator 50 at the top of the transformer secondary winding passes through diode 54 and is applied to the primary of the output transformer 58. When a −1 signal is applied to the terminals 53–57, diode 54 is kept non-conducting and diode 56 is rendered conducting. Therefore, the output signal for transformer 58 comes from the bottom end of the secondary of transistor 52. This signal is 180° out of phase from the signal at the top and of the transformer. When the ternary signal is of 0 value, neither of the diodes 54 or 56 is rendered conducting and no output signal is produced at the transformer 58. Therefore, it can be seen that in response to the +1 or the −1 signals, the output signal at transformer 58 is of the same amplitude but 180° out of phase and when a 0 signal is applied there is no output signal at the transformer 58. In this manner the amplitude modulated carrier wave of FIGURE 1, line D, is produced in response to the ternary control signal.

Amplitude modulated pulses of maximum amplitude corresponding to a +1 or a −1 and of zero amplitude corresponding to a 0 are picked up at the system's receiver. While the signals corresponding to the +1 and −1 are 180° out of phase, this will not make any difference at the receiver and for the purpose of transmitting 1 and 0 binary information, it is not necessary to distinguish between these reversed phases at the receiver. The receiver only responds to the amplitude modulated envelope of the carrier oscillator 50 and demodulates the envelope in any one of a number of well known ways so that the 1 and 0 received signals correspond exactly to the original binary coded signals which were transmitted. Therefore, it should be clear that the ternary signals are compatible for use with any type of receiver. While the received signals do not affect the receiver capability in any manner, it should still be realized that the use of the ternary type signal with the reversed phase carrier accomplishes a substantial bandwith reduction.

FIGURE 6 shows an alternative circuit which may be utilized to directly convert the binary coded information into the ternary transmitted carrier wave output signal. This circuit combines some of the features of the circuits of FIGS. 2 and 5 and consequently, those elements which are the same have been given the same reference numbers. This circuit is particularly adapted to use in A.C. operation.

The binary input information is applied to the input of a complementary flip-flop 26 which reverses its output condition after every 1–0 transition of the input signal. The two outputs of the flip-flop are respectively connected to the base electrodes of two transistor switches 60 and 62. These transistors have their input emitter electrodes connected to the bottom and top ends of the secondary of the center-tapped transformer 52 which in turn receives energy from the continuously operating oscillator 50. The output collector electrodes of the transistors are connected together and feed the collector of a transistor 67 whose base electrode is respectively connected to the binary signal input. Transistor 67 is connected as an emitter-follower amplifier with the output taken across the transformer 58.

In operation, transistors 60 and 62 are alternately conducting during each successive block of 1's due to the reversal of the flip-flop after every 1–0 transition. Therefore, the signal appearing at the common junction of the collector electrodes is 180° out of phase depending on which of the transistors 60 or 62 is made conductive by the flip-flop 59. The two signals 180° out of phase directly correspond to the +1 and −1 signals of FIGURE 2. In order to preserve the amplitude modulation of the carrier wave envelope, the binary coded input signal is also supplied to the base electrode of the transistor 67. In response to a binary 1 input, transistor 67 conducts and the carrier wave signal applied to its collector electrode appears across the primary of transformer 58. When a binary 0 is present at the base of transistor 67, the transistor is cut-off and no signal is passed therethrough. Thus, in response to the binary input signal, the flip-flop 26 determines which phase of the carrier signal is to be applied to the transistor 67, and the transistor 67 in turn controls the amplitude to determine whether a pulse corresponding to a binary 1 or a binary 0 is to be applied to the output transformer 58.

Therefore it can be seen that a novel system has been disclosed for the reduction of bandwith needed in the transmission of binary signals. While several types of preferred circuits have been described for carrying out the invention it should be realized that other types are also suitable. For example, the NOR logic circuit of FIGURE 2 may be replaced by other types of computer logic circuits which perform the same function, in accordance with the well known computer techniques. Also, any suitable type of component may be used to perform the various logic functions, for example, PNP or NPN transistors, vacuum tube, diodes, magnetic cores, tunnel diodes, etc.

Although a particular structure has been described, it should be understood that the invention should not be limited to the particular embodiment of the invention shown by way of illustration, but rather to the scope of the invention covered by the appended claims.

What is claimed is:

1. A binary to ternary code conversion system comprising input means for receiving a binary coded signal formed by first and second signals, and means connected to said input means for converting said binary signal into a ternary coded signal formed by first, second and third signals including means for determining the transition from a second to a first signal in said binary coded signal, and means for converting the second signals occurring between a selected two successive ones of said transitions into said third signals of said ternary signal.

2. A binary to ternary code conversion system comprising input means for receiving a binary coded signal formed by 0 and 1 bits, and means connected to said input means for converting said binary signal into a ternary signal formed by 0, +1, and −1 bit including means for determining the transition from a 1 bit to a 0 bit in said binary coded signal, and means for converting the 1 bits occurring between a selected two successive ones of said transitions into said −1 bits of said ternary signal.

3. A binary data transmission system comprising input means for receiving a binary coded signal formed by first and second signals, means connected to said input means for converting selected ones of said second signals into third signals in accordance with the sequence of occurrence of said second signals with respect to said first signals thereby producing a ternary signal formed by said first, second and third signals, means for producing a carrier wave, means connected to said carrier wave producing means and responsive to said first, second and third signals to control the amplitude of said carrier wave, and means responsive to said second and third signals for controlling a phase characteristic of said carrier wave.

4. A data transmission system comprising means for producing a carrier wave, means for forming a ternary signal of first, second and third signals to amplitude and phase module said carrier wave, means responsive to said first, second and third signals to amplitude modulate said carrier, said last named means being operative to produce carrier wave signals of a relative minimum amplitude in response to said first signals and carrier wave signals of a relative maximum amplitude in response to said second and third signals, and means responsive to said second and third signals for varying a phase characteristic of said carrier wave in a respectively different manner.

5. A data transmission system comprising means for producing a carrier wave, means for forming a ternary signal of first, second and third signals to amplitude and phase modulate said carrier wave, means responsive to said first, second and third signals to amplitude modulate said carrier wave, said last named means being operative to produce carrier wave signals of a first amplitude in response to said first signals and carrier wave signals of a second amplitude in response to said second and third signals, and making responsive to said second and third signals to shift the phase of said carrier by 180° respectively.

6. A binary data transmission system comprising means for converting a binary coded signal formed by first and second signals into a ternary coded signal formed by first, second and third signals, means for producing a carrier wave, means connected to said carrier wave producing means and responsive to selected ones of said first, second and third signals to control the amplitude of said carrier wave, and means connected to said carrier wave producing means and responsive to selected ones of said first, second and third signals to control the phase characteristic of said carrier wave.

7. A binary data transmission system comprising means for converting a binary coded signal formed by first and second signals into a ternary coded signal formed by first, second and third signals, means for producing a carrier wave, means responsive to said first, second and third signals for controlling the amplitude of said carrier wave, said last named means being operative to produce carrier wave signals of a first amplitude in response to said first signals and carrier wave signals of a second amplitude in response of said second and third signals, and means responsive to said first, second and third ternary signals for controlling the phase characteristic of said carrier wave.

8. A binary data transmission system comprising means for converting a binary coded signal formed by first and second signals into a ternary coded signal formed by first, second and third signals, said last named means being operative to convert some of said second signals of said binary coded signals into said third signals in accordance with the sequence of occurrence of said second signals with respect to said first signals in said binary signal, means for producing a carrier wave, means responsive to said first, second and third signals for controlling the amplitude of said carrier wave, said last named means being operative to produce carrier wave signals of a first amplitude in response to said first signals and carrier wave signals of a second amplitude in response to said second and third signals, and means responsive to said second and third signals to produce carrier wave signals which are approximately 180° out of phase as determined respectively by said second and third signals.

9. A binary data transmission system comprising means for converting a binary coded signal formed by 0 and 1 bits into ternary signal formed by 0, +1 and −1 bits, said last named means being operative to convert each block of 1 bits occurring in said binary signal after a 1 to 0 bit transition into the −1 signals of said ternary signals, means for producing a carrier wave, means responsive to said 0, +1 and −1 bit signals for modulating the amplitude and phase of said carrier wave, said last named means being operative to produce carrier wave signals of a first amplitude in response to said 0 bits of said ternary signal and carrier wave signals of a second amplitude in response to said +1 and −1 bits, and means responsive to said +1 and −1 bits of said ternary signal for controlling a phase characteristic of said carrier wave.

10. A binary data transmission system comprising means for converting a binary coded signal formed by 0 and 1 bits in a ternary signal formed by 0, +1 and −1 bits, said last named means being operative to convert each block of bits occurring in said binary signal after a 1 to 0 bit transition into the −1 signals of said ternary signal, means for producing a carrier wave, means responsive to said 0, +1 and −1 bit signals for modulating the amplitude and phase of said carrier wave, said last named means being operative to produce carrier wave signals of a first amplitude in response to said 0 bits of said ternary signals and carrier wave signals of a second amplitude in response to said +1 and −1 bits, and means operative in response to said +1 and −1 bits to produce portions of the carrier wave which are respectively 180° out of phase.

11. A binary to ternary code conversion system for reducing the bandwidth of a binary signal comprising input means for receiving a binary coded signal formed by first and second signals, means for sensing a second signal to first signal transition in said binary signal, and means responsive to the sensing of said second to first binary signal transition for converting successive ones of said second signals in said binary signal into a third signal to form a ternary signal having first, second and third signals, means for sensing a first signal to second signal transition in said binary signal occurring after said ones of said second signals which have been converted, and means responsive to the sensing of the first to second binary signal transition for stopping the conversion of later occurring second binary signals to third signals.

12. A binary to ternary code conversion system for reducing the bandwidth of a binary signal comprising input means for receiving a binary coded signal formed by first and second signals, means for sensing a second signal to first signal transition in said binary signal, means responsive to the sensing of said second to first binary signal transition for converting successive ones of said second signals in said binary signal into a third signal to form a ternary signal having a first, second and third signals, means for sensing a first signal to second signal transition in said binary signal occurring after said ones of said second signals which have been converted, and means responsive to the sensing of the first to second binary signal transition for stopping the conversion of later occurring second binary signal, to third signals, means for producing a carrier wave, and means responsive to at least two of said signals in said ternary signal for selectively modifying a characteristic of the carrier wave.

13. A system for reducing the bandwidth of a binary signal formed by a number of sequentially occurring 1 and 0 bits by converting said binary signal into a ternary signal having 0, +1 and −1 bits comprising input means for receiving said binary signal, means for sensing a first transition of the binary signal from a 1 to a 0 bit, means responsive to the sensing of the first transition to convert the 1 bits in the binary signal occurring following the first transition and before the next occurring 0 bit into −1 bits, means for sensing a second transition of the binary signal from a 0 to a 1 bit occurring after said ones of said 1 bits which have been converted, and means responsive to the sensing of the second transition for converting the next 1 bits in the binary signal occurring before another first transition into +1 bits.

14. A system for reducing the bandwidth of a binary signal formed by a number of sequentially occurring 1 and 0 bits by converting said binary signal into a ternary signal having 0, +1 and −1 bits comprising input means for receiving said binary signal, means for sensing a first transition of the binary signal from a 1 to a 0 bit, means responsive to the sensing of the first transition to convert the 1 bits in the binary signal occurring following the first transition and before the next occurring 0 bit into −1 bits, means for sensing a second transition of the binary signal from a 0 to a 1 bit occurring after said ones of said 1 bits which have been converted, means responsive to the sensing of the second transition for converting the next 1 bits in the binary signal occurring before another first transition into +1 bits, means for producing a carrier wave, and means responsive to said +1 and −1 bits of said ternary signal for selectively modifying a characteristic of said carrier wave.

References Cited by the Examiner

UNITED STATES PATENTS

| | | | |
|---|---|---|---|
| 2,700,696 | 1/1955 | Barker | 340—347 X |
| 2,839,728 | 6/1958 | Jacoby et al. | 340—347 X |
| 3,139,615 | 6/1964 | Aaron | 340—347 |
| 3,149,323 | 9/1964 | Aaron et al. | 340—347 |
| 3,154,777 | 10/1964 | Thomas | 340—347 |

ROBERT C. BAILEY, *Primary Examiner.*

WALTER W. BURNS, Jr., *Examiner.*

P. J. HENON, *Assistant Examiner.*

UNITED STATES PATENT OFFICE
CERTIFICATE OF CORRECTION

Patent No. 3,233,236 February 1, 1966

Henry S. Katzenstein et al.

It is hereby certified that error appears in the above numbered patent requiring correction and that the said Letters Patent should read as corrected below.

Column 1, line 45, strike out "been", second occurrence; column 3, line 69, after "system" insert -- than --; column 7, line 69, for "module" read -- modulate --; column 9, line 2, for "in" read -- into --; line 4, before "bits" insert -- 1 --; line 11, for "signals", first occurrence, read -- signal --; line 46, for "signal," read -- signals --.

Signed and sealed this 17th day of January 1967.

(SEAL)
Attest:

ERNEST W. SWIDER
Attesting Officer

EDWARD J. BRENNER
Commissioner of Patents